US005934629A

United States Patent [19]

Peritz

[11] Patent Number: 5,934,629

[45] Date of Patent: Aug. 10, 1999

[54] MOUNTING MECHANISM FOR MOUNTING A CYMBAL

[76] Inventor: Mark Peritz, P.O. Box 503, Woodstock, N.Y. 12498

[21] Appl. No.: 09/089,552

[22] Filed: Jun. 3, 1998

[51] Int. Cl.$^{6}$ .................................................... G01D 13/06

[52] U.S. Cl. .......................... 248/177.1; 84/402; 84/421; 248/121

[58] Field of Search ................................ 248/177.1, 687, 248/124.1, 121; 84/421, 422.3, 402

[56] References Cited

U.S. PATENT DOCUMENTS

| | | | |
|---|---|---|---|
| 3,677,127 | 7/1972 | Garven | 84/402 |
| 4,271,745 | 6/1981 | Shatto | 84/402 |
| 4,889,028 | 12/1989 | Lombardi | 84/421 |
| 4,960,028 | 10/1990 | Ramierz | 84/421 |
| 5,218,151 | 6/1993 | Kurosaki | 84/422.3 |
| 5,388,495 | 2/1995 | Atsumi | 84/422.3 |
| 5,482,235 | 1/1996 | Atsumi | 248/121 |
| 5,808,217 | 9/1998 | Liao | 84/422.3 |

*Primary Examiner*—Ramon O. Ramirez
*Assistant Examiner*—Anita M. King

[57] ABSTRACT

A mounting mechanism for mounting a cymbal on a stand to produce an improved musical sound, the mounting mechanism including a pair of opposing magnets, mounted to slide on a shaft with the cymbal held between two felt cushions supported on the floating action of the opposing magnets.

11 Claims, 3 Drawing Sheets

MOUNTING MECHANISM FOR MOUNTING A CYMBAL

BACKGROUND OF THE INVENTION

1. Field of the Invention

This device relates to cymbals such as the cymbals used to make a musical sound and more particularly to a mechanism for mounting such a cymbal to provide an improved sound and resonance.

2. Prior Art and Objects

Cymbals are well known percussion devices usually played by a drummer. The best sound of a cymbal is a ringing sound or clear resonance and it is most urgently desired to avoid having a cymbal produce a dead sound. Cymbals have been made with a bell-shape at the center point to assist in producing a ringing sound of high resonance but mounting the cymbal in known devices still results in a sound which lacks the resonance desired.

This invention provides a mechanism by which a cymbal can be held in place for predictable striking and still provide a clear resonance.

Accordingly, it is an object of the present invention to provide a mechanism to support a cymbal that permits the cymbal to produce a high resonance sound utilizing existing standard cymbal stands.

It is a further object of the present invention to provide a mechanism for supporting a cymbal that is durable.

It is a further object of the present invention to provide a mechanism for supporting a cymbal that retains the cymbal in a fixed location for certainty of striking.

It is a further object of the present invention to provide a mechanism for supporting a cymbal that is economical to produce.

Other objects and advantages of the present invention will become apparent to those of ordinary skill in the art as the description thereof proceeds.

SUMMARY OF THE INVENTION

A mechanism is provided for supporting and retaining a cymbal. A rod, which usually would be vertically oriented, includes a means such as a coupling at its lower end for securing the rod to a stand such as are generally available for holding cymbals. A lower washer is mounted on the rod against the securing means or coupling or is otherwise affixed to the rod and serves as a base for the mechanism. Mounted on the rod, so as to be capable of sliding on the rod, are a pair of magnets, one above the other. The magnets have an opening through them at their center point. A sleeve is placed inside the opening in each magnet which sleeve is plastic so as to not be conductive of magnetic flux. The magnets, an upper magnet and a lower magnet, each have positive side and a negative side and the magnets are placed one above the other so that the sides of the same polarity face one another, thus causing the two magnets to repel one another. A lower cushion is placed above the upper magnet. A cymbal washer, which includes a circular washer and a tube fixedly mounted thereon that is non magnetic is placed between the upper magnet and a lower cushion and about the rod and the tube extends beyond the lower cushion. The cymbal is placed on the rod to rest on the lower cushion with the tube extending through the opening in the cymbal. Above the cymbal and on the rod, an upper cushion is placed with the tube extending into the upper cushion. At the upper end of the rod, a securing means is used to hold the upper cushion on the cymbal.

DESCRIPTION OF THE PREFERRED EMBODIMENT

Figure 1:
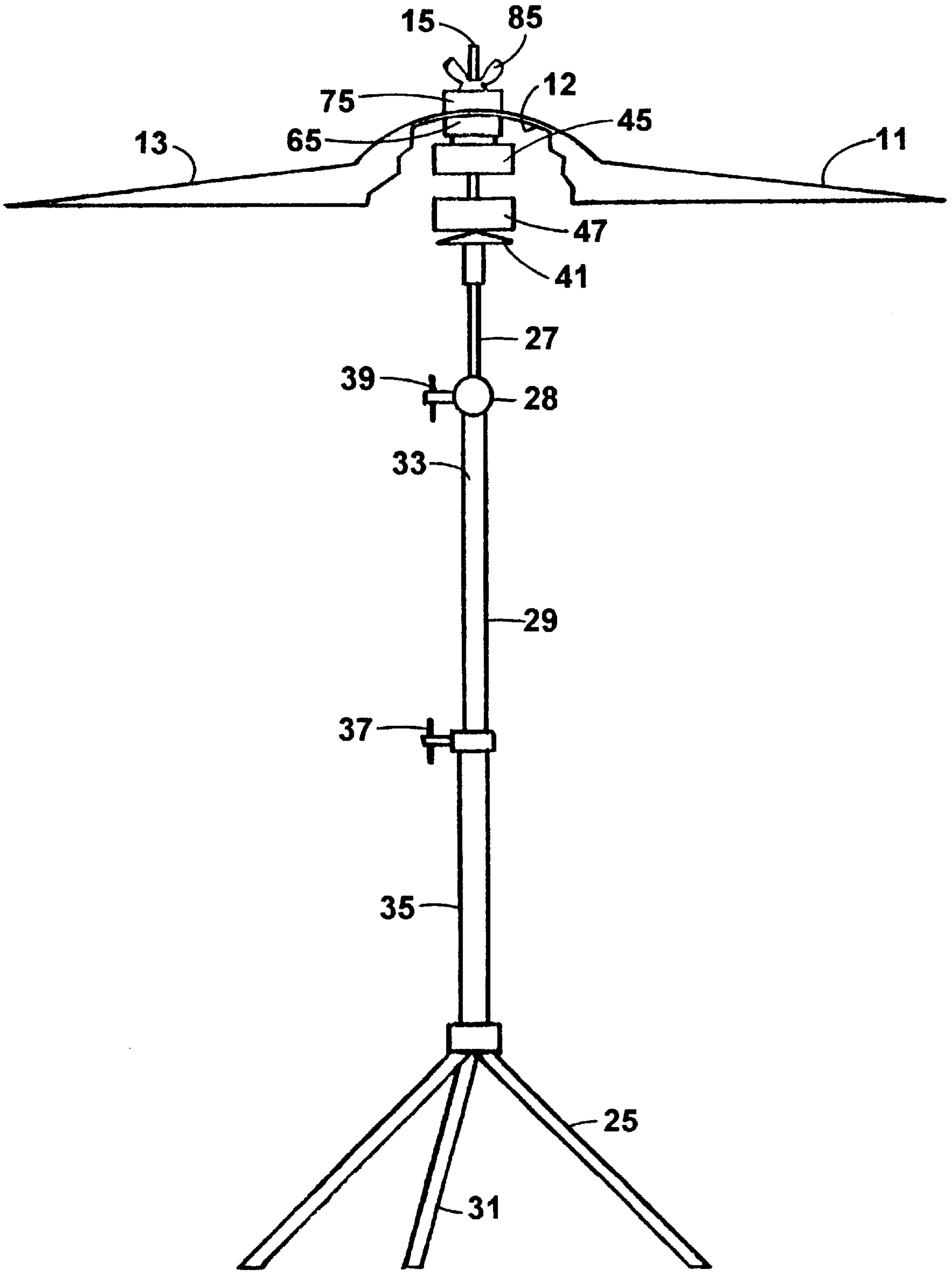
FIG. 1 is a side elevation, partially sectioned, of a cymbal mounted on a rod and supported by a pair of magnets in accordance with the invention with the rod mounted on a standard cymbal stand.

Referring now to the drawings and more particularly to FIG. 1, a cymbal 11 is shown such as used by a drummer to produce resonant sounds by striking the cymbal 11, usually with a drum stick (not shown). Cymbals 11 have varying shapes, generally symmetrical and circular thus having a curved cross-section, being concave on their lower surface 12 and being convex on their upper surface 13. It is customary for cymbals 11 to be made of brass. The cymbal 11, as has been customary in the past, has an opening 14 at its center point.

The mechanism for supporting the cymbal 11, in accordance with this invention, uses a rod 15 for a basic structural member. The rod 15 is preferably made of brass and must be made of a material that is non magnetic.

The rod 15 has an upper end 17 where the cymbal 11 is generally located. The upper end 17 has a male thread 19 at the upper end 17 for a portion of the length of the rod 15, the portion being substantial but less than half the length of the rod 15. The lower end 21 of the rod 15 has a coupling 23 rigidly mounted on it which preferably has a female thread. The coupling 23 is secured to the upper most end of a cymbal stand 25 for supporting the rod 15.

The cymbal stand 25, which is known equipment, preferably includes a shaft 27 which is threaded and on which the coupling 23 or other means for mounting the rod is mounted. The shaft 27 preferably is mounted on a pivot 28 which is also usual for cymbal stands 25. The shaft 27 is mounted on a column 29 which is telescoping The column 29 is mounted on a base 31 which preferably, as is shown in FIG. 1, is a tripod, with the column 29 extending upwardly from it. The column 29 has two sections, an upper column 33 and a lower column 35. The upper column 33 slides up and down in the lower column 35. The upper column 33 may be held at any number of various points by a turn screw 37 which permits the location of the cymbal 11 at a height most convenient for use. The pivot 28, previously referred to, is located at the top of the upper column 23 and also includes a turn screw 39 so that a desired angle to the vertical can be selected and maintained.

Figure 2:
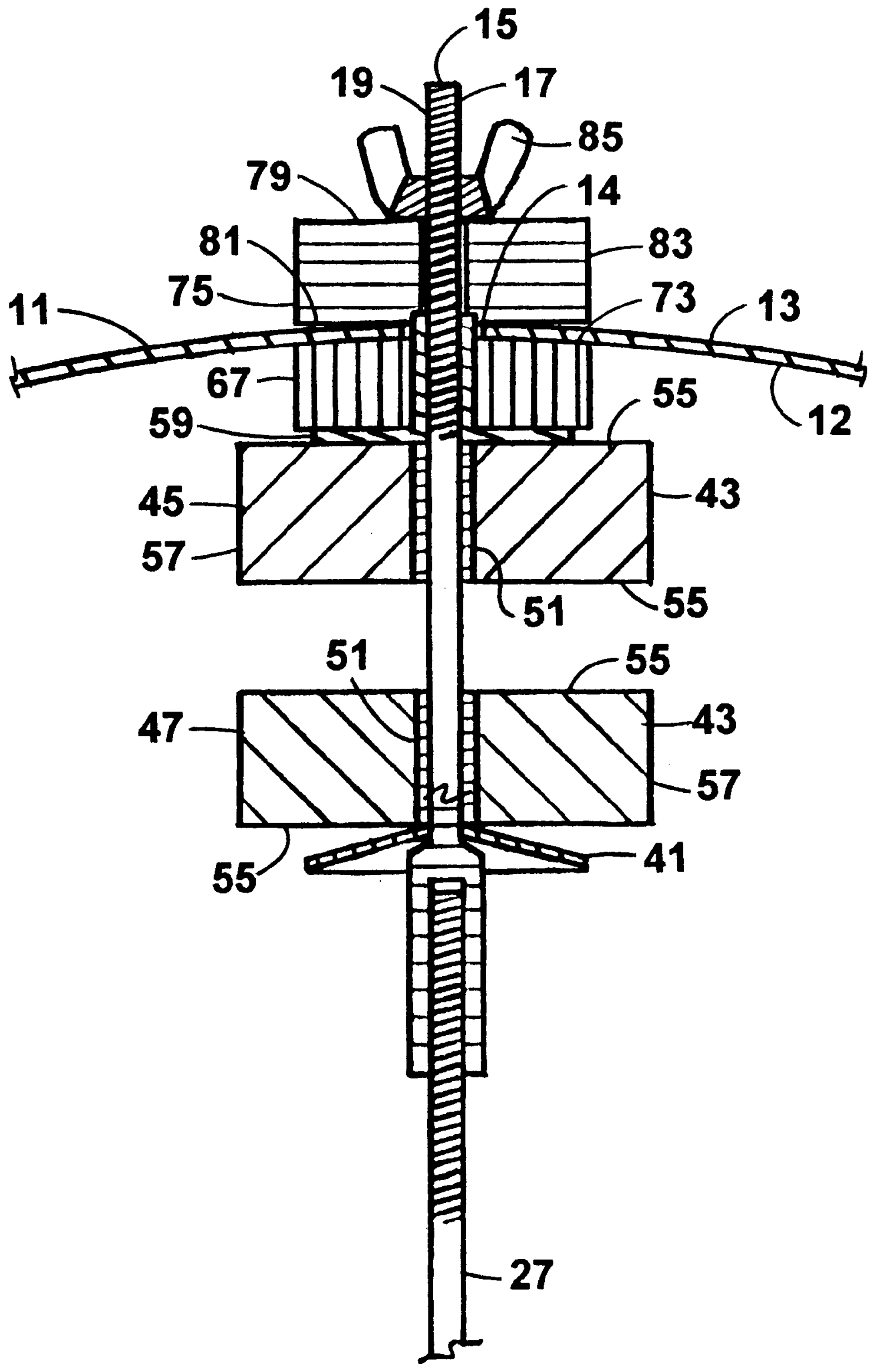
FIG. 2 is a ross section of the mechanism for supporting a cymbal along the length thereof showing the magnets on the rod which is mounted on the end of a stand.

Referring to FIG. 2, a lower washer 41 is located on the rod 15. The lower washer 14 is usually round and may be flat or may be cone-shaped as shown in FIG. 1 and slides on the rod 15 and rests against and is supported on the coupling 23 since the coupling 23 has a greater diameter than the rod 15. The lower washer 41, however, may be secured to the rod 15 in any number of ways. Similarly, the coupling may be replaced by a wide variety of mounting means. The lower washer 41 needs to be made from a non magnetic material, such as brass, but may be made from other materials such as a strong plastic.

Magnets 43 are placed on the rod 15, so as to slide on the rod 15. There are two magnets 43, an upper magnet 45 and a lower magnet 47. The lower magnet 47 is closest to the coupling 23 and rests on the lower washer 41. The upper magnet 45 is most remote from the coupling 23.

Both magnets 43 preferably have the same dimensions and are circular, with an opening 49 at their center point. The opening 49 is also circular and larger than the rod 15. A sleeve 51 of non magnetic material is placed in the opening of each magnet 43 so as to be retained in each magnet 43 but each sleeve 51 has an opening 53 in it which permits each magnet 43 with a sleeve 53 in the magnet 43 to slide on the rod 15. A suitable non magnetic material for the sleeve 51 would be a hard plastic that will permit smooth travel on the rod 15. Each sleeve 51 should also be fitted so as to be firmly retained within its respective magnet 43.

Each magnet 43, as is customary with magnets, has a positive polarity side and a side of negative polarity. As is known, the opposite polarities attract one another while the same polarities repel each other. Each magnet 43 is a cylindrical disk having two surfaces 55, generally parallel to one another, each surface 55 being circular. Each magnet 43 also has a cylindrical surface 57.

The magnets 43 are placed on the rod 15 so that the surfaces 55 of the same polarity face one another. Since the surfaces 55 of the magnets 43 with the same polarity repel one another, the upper magnet 45 and lower magnet 47 force one another apart. Since the lower magnet 47 rests on the lower washer 41, the upper magnet 45 floats above the lower magnet 47 and is held apart from the lower magnet 47 by the force of repulsion of the two magnets 43.

Whether the polarity of the surfaces 55 selected to face one another is positive or negative is not important but it is absolutely essential that the two surfaces 55 facing each other are of the same polarity so as to repel one another. This is easily determined since the magnets 43 readily repel each other when surfaces 55 of the same polarity face one another and cling to one another when surfaces 55 of opposite polarity are brought into the vicinity of one another.

The magnets 43 found most suitable for use in supporting a cymbal 11 are those magnets 43 made from Neodymium-Boron which is a rare earth ceramic material. The gauss reading for each magnet 43 should be in the range of 1400 to 1800 gauss and when the magnets 43 are in opposition to each other during use, the gauss reading should be approximately 2900 gauss and within a range of 2500 gauss and 3300 gauss. The distance between the magnets 43 during use would be approximately one-half inch and be within a range of one-quarter inch to three-quarter inches.

Figure 3:
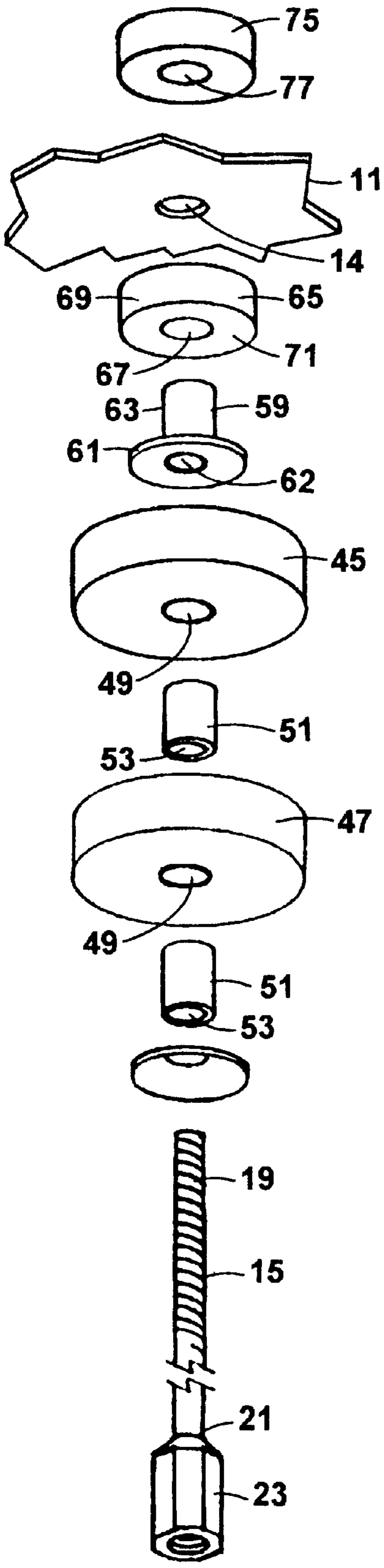
FIG. 3 is an assembly view of the mechanism showing the upper and lower magnets, sleeves, rod, lower washer and cymbal washer and upper and lower cushions.

A cymbal washer 59, (FIG. 3) which is a combination of a circular washer 61 with an opening 62 having a tube 63 fixedly mounted on the circular washer 61 at the opening 62 of the circular washer 61. The cymbal washer 59 is mounted with the tube 63 about the rod 15 and with the circular washer 61 on the surface 55 of the upper magnet 45 away from the lower magnet 47. The cymbal washer 59 must be in one piece and is made of a non magnetic material, most preferably a strong plastic. Cymbal washers 59 are conventional items previously used with earlier known devices for mounting cymbals 11.

A lower cushion 65 preferably made from felt, is placed about the tube 63 and on the circular washer 61 of the cymbal washer 59. The tube 63 extends a short distance above the lower cushion 65. The lower cushion 65 is preferably cylindrical with an opening 67 generally at its center point which is the opening 67 placed about the rod 15. The lower cushion 65 has a cylindrical surface 69 about its circumference and a lower surface 71 and an upper surface 73 both of which are circular. The lower surface 71 rests on the circular washer 61 of the cymbal washer 59. Since the lower cushion 65 is soft and the cymbal is comparatively heavy, the upper surface 73, due to its softness, conforms to the lower surface 12 of the cymbal 11, which is concave, when the cymbal 11 rests upon the lower cushion 65. Accordingly, the lower cushion 65 assumes an upper surface 73 which is convex. This results in virtually complete surface contact between the lower cushion 65 and the lower surface 12 of the cymbal 11.

The cymbal 11 is placed with the rod 15 through the opening 14 in the cymbal 11 and with the tube 63 of the cymbal washer 59 extending through the opening 14 in the cymbal 11. The cymbal washer 59 prevents the cymbal 11 from touching the rod 15 and also stabilizes the cymbal 11.

An upper cushion 75 which is also preferably made from felt, is placed about the rod 15 above the cymbal 11. The upper cushion 75, which is also preferably cylindrical with an opening 77 at its center point, has an upper surface 79 which is circular and a lower surface 81 which is circular as well as a cylindrical surface 83 about its circumference. Since the weight of the upper cushion 75 is minimal, there is limited weight to cause the upper cushion 75 to press against the cymbal 11. Since the upper surface 13 of the cymbal 11 is convex and the lower surface 81 of the upper cushion 75 is flat and since there is minimal pressure of the upper cushion 75 against the cymbal 11, the upper cushion 75 contacts the cymbal 11 only in the immediate vicinity of the opening 14 in the cymbal 11 and the opening 77 in the upper cushion 75. The further the radial distance from the openings 14,75, the greater the distance between the upper surface 13 of the cymbal 11 and the lower surface 71 of the upper cushion 75. The tube 63 of the cymbal washer 59 extends just slightly into the opening 77 of the upper cushion 75.

A wing nut 85 is threaded onto the rod 15 and against the upper cushion 75 loosely to hold the cymbal 11 between the lower cushion 65 and the upper cushion 75. No washer is normally placed between the wing nut 85 and the upper cushion 75 so as to permit as much movement of the upper cushion 75 as is possible. The wing nut 85 may be replaced by any securing means loosely to hold the cymbal 11 between the upper cushion 75 and the lower cushion 65.

As the cymbal 11 is struck and is forced down at one point and up at an opposite point, the upper cushion 75 and the lower cushion 65 compress and expand with the movement of the cymbal 11. Any downward force of the cymbal 11, however, passes though the lower cushion 65 and is absorbed by the floating action of the upper magnet 45 being held away from the lower magnet 47 by the magnetic repulsion of the upper magnet 45 and the lower magnet 47.

Thus, while a preferred embodiment of the invention has been shown and described, it will be apparent to those skilled in the art that many other changes and modifications may be made without departure from the invention in its broader aspects. The appended claims are therefore intended to cover all such changes, and modifications as full within the true spirit and scope of the invention.

I claim:

1. A mounting mechanism for retaining a cymbal in place while permitting high resonance sound to be produced by the cymbal, comprising:

a rod of non-magnetic material, said rod having an upper end and an lower end, the lower end including a means for mounting the rod;

a lower washer mounted on the rod;

a pair of magnets including an upper magnet and a lower magnet each having substantially the same size and configuration with an opening through each magnet, the opening being substantially at the center point of each magnet, each magnet having two surfaces, each surface having a polarity opposite from the other surface, both the upper magnet and the lower magnet being mounted on the rod so as to slide on the rod, the lower magnet being located on the lower washer, the upper magnet and lower magnet having surfaces of the same polarity facing one another to repel one another and maintain the upper magnet above the lower magnet for a distance of separation;

a cymbal washer of non-magnetic material including a tube portion mounted about the rod on the face of the upper magnet opposite from the lower magnet;

a lower cushion having an opening therein mounted on the cymbal washer and about the tube portion of the cymbal washer, the tube of the cymbal washer extending beyond the lower cushion away from the upper magnet;

a cymbal with an opening in it mounted on the lower cushion with the tube of the cymbal washer extending through the opening in the cymbal;

an upper cushion having an opening therein mounted on the rod and against the cymbal, the tube of the cymbal washer extending into the upper cushion; and securing means mounted on the rod loosely to hold the upper cushion against the cymbal.

2. A mounting mechanism according to claim 1 wherein the cymbal washer includes a circular washer with an opening through it and with the tube portion fixedly mounted on the opening of the circular washer.

3. A mounting mechanism according to claim 1 wherein the openings in the lower magnet and the upper magnet are larger than the rod on which the lower magnet and the upper magnet are mounted and further including a sleeve mounted within the opening of the lower magnet and a sleeve mounted in the opening of the upper magnet.

4. A mounting mechanism according to claim 1 wherein the upper magnet and the lower magnet are both made of Neodymium-Boron.

5. A mounting mechanism according to claim 1 wherein the upper magnet and the lower magnet are both made from a rare earth ceramic material.

6. A mounting mechanism according to claim 1 wherein the upper magnet and the lower magnet are maintained at a distance of separation in the range of one quarter of an inch to three-quarters of an inch.

7. A mounting mechanism according to claim 1 wherein the gauss reading between the upper magnet and the lower magnet when in opposition to one another is in the range of 2500 gauss to 3300 gauss.

8. A mounting mechanism for retaining a cymbal in place while permitting high resonance sound to be produced by the cymbal, comprising:

a rod of non-magnetic material, said rod having an upper end and a lower end, the lower end including a means for mounting the rod;

a lower washer mounted on the rod toward the means for mounting the rod;

a pair of magnets including an upper magnet and a lower magnet, each having substantially the same size and configuration with an opening through each magnet, the opening being substantially at the center point of each magnet, each magnet having two surfaces, each surface having a polarity opposite from the other surface, the opening in each magnet being larger than the rod;

a sleeve of non-magnetic material mounted in the opening of the upper magnet and the lower magnet, each sleeve having an opening therein, the upper magnet with the sleeve and the lower magnet with the sleeve being mounted on the rod so as to slide on the rod, the lower magnet with the sleeve being located on the lower washer, the upper magnet and the upper magnet being mounted on the rod with surfaces of the same polarity facing one another to repel one another and maintain the upper magnet above the lower magnet for a distance of separation;

a cymbal washer of non-magnetic material including a washer portion and a tube portion extending from the washer portion mounted about the rod on the face of the upper magnet opposite from the lower magnet, wherein the washer portion has an opening and wherein the tube portion is fixedly mounted on the opening of the washer portion;

a lower cushion having an opening therein mounted on the washer portion of the cymbal washer and about the tube portion of the cymbal washer, the tube portion of the cymbal washer extending beyond the lower cushion away from the upper magnet;

a cymbal with a lower surface having an opening therein mounted on the lower cushion with the tube portion of the cymbal washer extending through the opening in the cymbal, the lower cushion conforming to the lower surface of the cymbal;

an upper cushion having an opening therein mounted on the rod and against the cymbal, the tube portion of the cymbal washer extending into the upper cushion; and securing means mounted on the rod to hold the upper cushion against the cymbal.

9. A mounting mechanism according to claim 8 wherein the upper magnet and the lower magnet are both made from a rare earth ceramic material.

10. A mounting mechanism according to claim 8 wherein the upper magnet and the lower magnet are maintained at a distance of separation in the range of one quarter of an inch to three-quarters of an inch.

11. A mounting mechanism according to claim 8 wherein the gauss reading between the upper magnet and the lower magnet when in opposition to one another is in the range of 2500 gauss to 3300 gauss.

* * * * *